INVENTORS
Akira Suzuki
Shigeru Ikeda

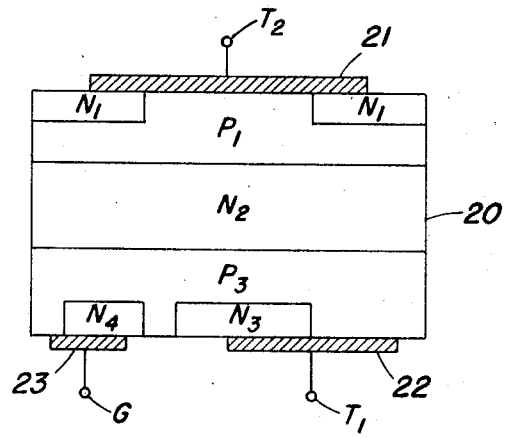
Fig. 1a.
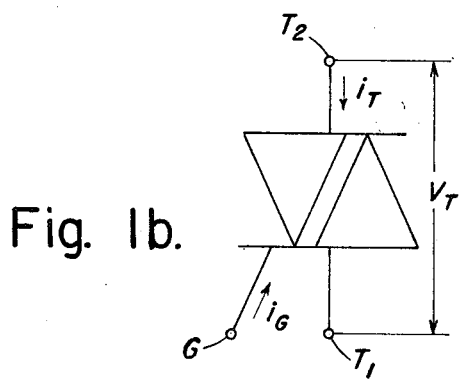
Fig. 1b.
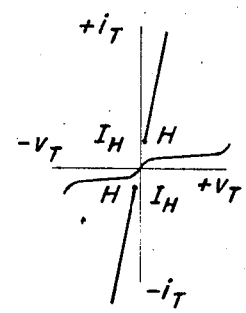
Fig. 1c.
Fig. 2a.
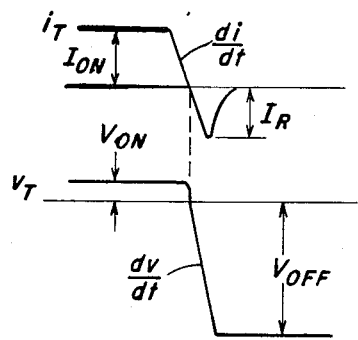
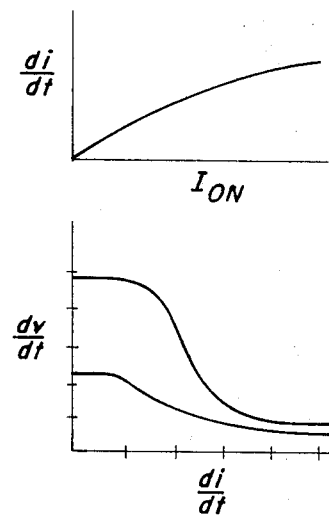
Fig. 2c.
Fig. 2b.

BY Marn & Jangarathis

ATTORNEYS

Fig. 6.
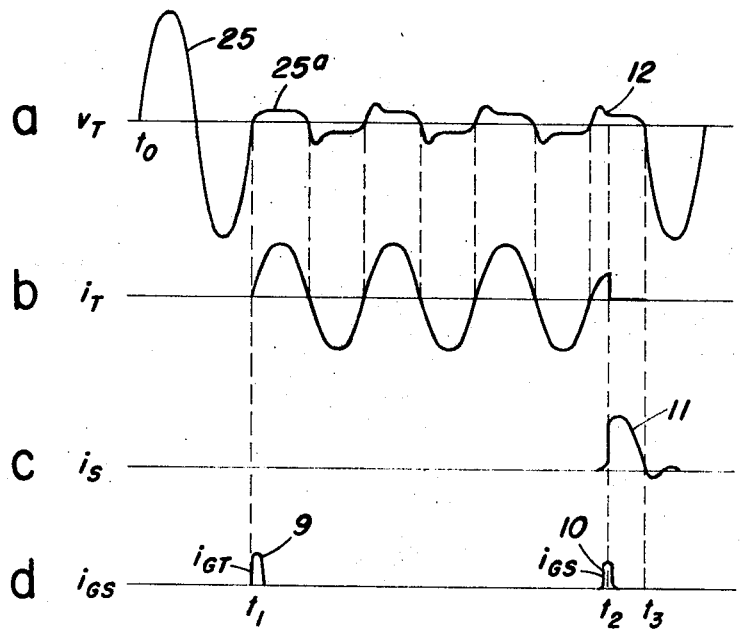
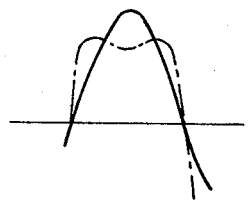
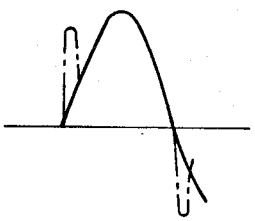
Fig. 7a.    Fig. 7b.

United States Patent Office 3,527,963
Patented Sept. 8, 1970

3,527,963
AC CURRENT SWITCHING CIRCUIT INCLUDING BIDIRECTIONAL AND UNIDIRECTIONAL THYRISTORS
Akira Suzuki and Shigeru Ikeda, Tokyo, Japan, assignors to Nippon Electric Company, Limited, Tokyo, Japan
Filed Jan. 30, 1968, Ser. No. 701,607
Claims priority, application Japan, Jan. 31, 1967, 42/6,401
Int. Cl. H03k 17/00
U.S. Cl. 307—252                          11 Claims

ABSTRACT OF THE DISCLOSURE

An AC static switching circuit including a source of alternating voltage, a load and a bidirectional and unidirectional thyristor parallel network connected in circuit in which the bidirectional and unidirectional thyristors are both normally turned OFF to establish effectively an open condition in the latter circuit, a first unidirectional gating pulse current turning ON at a first time period the bidirectional thyristor which thereupon self-generates at least a predetermined amount of alternating current to hold the turned ON state therein for a time interval equal to at least two one-half cycles of the alternating voltage to povide a closed condition in the circuit to permit current to flow in the load and a second unidirectional gating pulse current of positive polarity turning ON at a second time period the unidirectional thyristor which thereupon diverts therethrough such amount of alternating current from the turned ON bidirectional thyristor as to reduce the amount of alternating current flowing in the latter thyristor to an amount less than the predetermined amount thereby returning the bidirectional thyristor to the turned OFF state at a third time period, the turned ON unidirectional thyristor subsequently returning to the turned OFF state at the third time period, the last-mentioned turned OFF states of the bidirectional and unidirectional thyristors serving to re-establish the open condition in the series circuit to terminate the flow of current in the load and circuit.

This invention relates to an alternating current static switching circuit, and more specifically to such circuit including a plurality of semiconductor devices having different directional conductivities of which one self-holds an ON state therein over a time interval equivalent to at least two one-half cycles of a driving alternating voltage.

An alternating current static switching circuit of a type known in the prior art utilizes two three-terminal unidirectional conductive thyristors comprising silicon controlled rectifiers and connected in an inverse-parallel network. In this switching circuit, gating signals are intermittently applied to the gating terminals of the respective thyristors at successive cycles of the alternating current power during the required time in order to maintain successive turned ON states in the switching circuit. Another alternating current static switching circuit available heretofore in the prior art employs two bidirectional conductive thyristors of which one is a three-terminal type known as a TRIAC and the other is a two-terminal type identified as SSS (Silicon Symmetrical Switch). In this switching circuit, gating signals are repetitively applied to the gating terminal of the TRIAC thyristor at successive cycles of the alternating current power to provide the successive ON states in the switching circuit. It is therefore evident that the foregoing prior art alternating current static switching circuits require successive gating pulses at successive cycles of the alternating current power to the thyristors for maintaining successive ON states therein.

The present invention contemplates an alternating current static switching circuit establishing an alternating current self-holding ON state for a predetermined time interval in response to a single turn-ON gating pulse.

It is a principal object of the present invention to provide an improved alternating current static switching circuit.

Another object is to improve the operation of an alternating current static switching circuit.

An additional object is to provide an alternating current static switching circuit requiring only one turn-ON gating pulse to establish a self-holding ON state therein for a predetermined time interval.

It is another object to provide an alternating current static switching circuit requiring only a single turn-ON gating pulse and a single turn-OFF gating pulse while maintaining a self-holding ON state therebetween for a predetermined time interval.

It is a further object to provide an alternating current static switching circuit maintaining a self-holding ON state for a time interval equal to at least two one-half cycles of a driving alternating voltage in response to a single turn-ON gating pulse.

It is a still further object to provide an alternating current static switching circuit having a self-holding ON state extending over a time interval equivalent to more than one one-half cycle of a driving alternating voltage until terminated by a single turn-OFF gating pulse.

It is still an additional object to provide an alternating current static switching circuit with a continuous ON state for a predetermined time interval in response to one turn-ON gating pulse.

It is also an object to provide an alternating current static switching circuit triggered by an initial single turn-ON gating pulse to an ON state which is continuously held until terminated by a subsequent single turn-OFF gating pulse.

It is a further object to provide an alternating current static switching circuit holding its ON state for a period of time exceeding the time interval of one one-half cycle of a driving alternating voltage.

In association with an alternating current static switching circuit including a source of alternating voltage and a load, a specific embodiment of the present invention comprises a parallel network including a three-terminal bidirectional conductive thyristor in one branch and a three-terminal unidirectional conductive thyristor in a second branch, and circuit means for connecting the voltage source, load and parallel network in a circuit in which the two thyristors are normally in a turned OFF state to establish effectively an open condition in the latter circuit to prevent the flow of current in the load. A first generator supplies a first unidirectional pulse current at a first time period to the gating terminal of the bidirectional conductive thyristor which establishes an ON state therein and as a consequence self-generates at least a predetermined amount of alternating current to hold the ON state indefinitely thereby effectively establishing a closed condition in said circuit to permit current to flow in the load.

A second generator supplies a second unidirectional pulse at a second time period to the gating terminal of the unidirectional conductive thyristor which institutes an ON state therein to divert therethrough such amount of the alternating current from the turned ON bidirectional conductive thyristor as to reduce the alternating current flowing in the latter thyrisor to an amount less than the predetermined amount whereby the turned ON bidirectional conductive thyristor is caused to return to the turned OFF state at a third time period. The turned ON unidirectional conductive thyristor is also returned to the OFF state at the third time period. As the bidirectional and unidirectional thyristors are both now in the OFF state, the closed condition is effectively re-established in the circuit to terminate the flow of current in the load. The ON time of the bidirectional thyristor between the first and third time periods is for a time interval equivalent to at least two one-half cycles of source alternating voltage.

A feature of the invention is the self-generation of sufficient amount of alternating current by a turned ON bidirectional conductive thyristor to maintain the ON state therein until terminated by a subsequently turned ON unidirectional conductive thyristor. Another feature is use of a single gating pulse signal to establish the ON state in the bidirectional conductive thyristor for a time interval equivalent to more than one one-half cycle of a driving alternating voltage. A further feature is the use of an initial gating pulse signal to establish the ON state in the bidirectional conductive thyristor and a subsequent gating pulse signal to institute a turned ON state in the unidirectional conductive thyristor to turn OFF the turned ON bidirectional conductive thyristor while the latter thyristor produces sufficient amount of alternating current to hold the ON state therein for a predetermined time interval between the initial and subsequent gating pulse signals. An additional feature is the holding of the turned ON state for a predetermined time interval exceeding the time period of one one-half cycle of the driving alternating voltage.

The invention is readily understood from the following description taken together with the accompanying drawing in which:

FIG. 1a is a cross-sectional view of a three-terminal bidirectional thyristor;

FIG. 1b is a symbol representing a three-terminal bidirectional conductive thyristor of a type shown in FIG. 1a and usable in the circuit diagram of FIG. 5;

FIG. 1c is a group of waveforms illustrating a static characteristic of a type of three-terminal thyristor shown in FIG. 1a;

Figure 3:
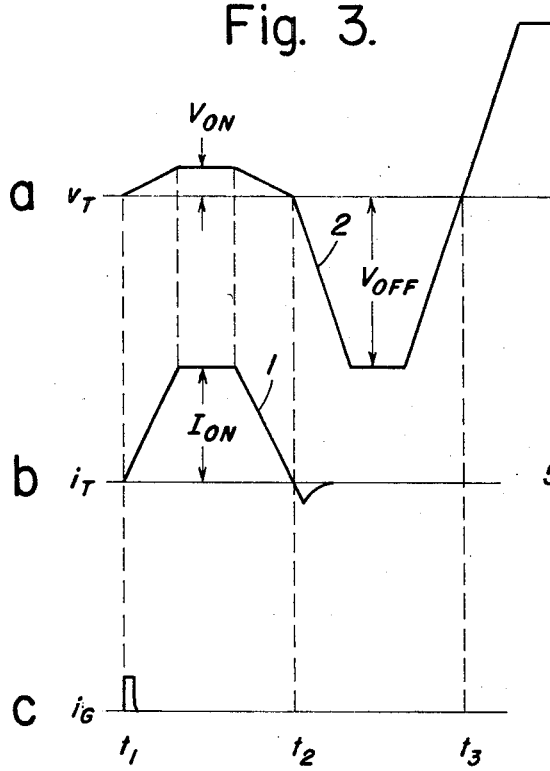
Figure 5:
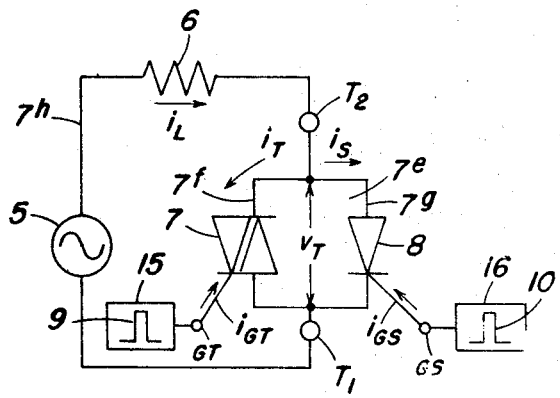
Figure 4:
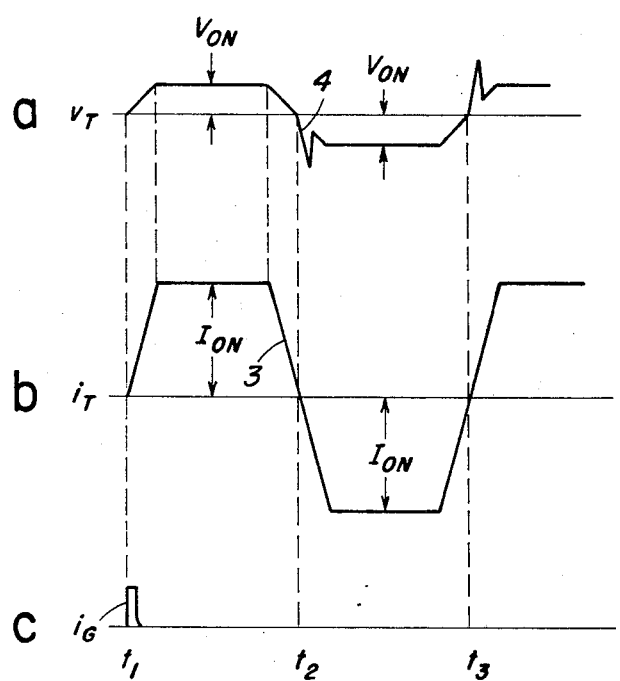

FIG. 2a includes waveforms showing the voltage and current effective at the bidirectional thyristor of FIG. 1a in the turned OFF state;

FIG. 2b shows waveforms illustrating the relationship between the critical rate of the OFF state voltage $dV/dt$ and the slope $di/dt$ of the current in the thyristor of FIG. 1a at the crossing point of the current and zero-axis;

FIG. 2c is a waveform delineating the relationship between the ON state current $I_{ON}$ and the slope $di/dt$ of the current in the bidirectional thyristor of FIG. 1a at the crossing point of the current and zero-axis;

FIG. 3a, b and c are waveforms indicating the voltage and the current effective in the turned ON thyristor of FIG. 1a as repetitively turned ON by each of successive gate signals;

FIGS. 4a, b and c are waveforms illustrating the voltage and the current effective in the turned ON thyristor of FIG. 1a as repetitively turned ON in response to a single gate signal;

FIG. 5 is a circuit diagram showing a specific embodiment of the present invention utilizing the bidirectional thyristor of FIG. 1a;

FIGS. 6a, b, c and d are waveforms of a voltage, a current and gate signals effective in FIG. 5; and FIGS. 7a and 7b are waveforms of other driving alternating voltages usable in FIG. 5.

FIG. 1a shows a three-terminal bidirectional conductive thyristor 20 which is essentially a NPNPN semiconductor device with five semiconductor layers of p-type and n-type having five junctions. The junctions of layer $P_1$ and two layers $N_1$ are short-circuited by electrode 21 to which terminal $T_2$ is connected. The junction of layer $P_3$ and layer $N_3$ is short-circuited by electrode 22 to which terminal $T_1$ is connected. The junction of layer $P_3$ and layer $N_4$ is short-circuited by electrode 23 to which gate terminal G is connected. Bidirectional thyristor 21 is turned ON when an alternating current voltage VT is applied across terminals $T_1$ and $T_2$ and a unidirectional pulse current $i_G$ is applied at the same time to gate terminal G as illustrated in FIGS. 1a, b and c. In the ON state of bidirectional thyristor 21, an alternating current $i_T$ is caused to flow through terminals $T_1$ and $T_2$. The thyristor is held in the ON state by a holding alternating current $I_H$ having at least a predetermined absolute value H; and the thyristor is turned OFF when the value of the ON state alternating current $I_H$ decreases to a value below the predetermined value H, as it is explained in further detail hereinafter. The thyristor can withstand a voltage of several hundred volts applied across terminals $T_1$ and $T_2$ in the turned OFF state, i.e., when the gating current $i_G$ is zero.

FIG. 2a illustrates typical current and voltage waveforms effective at the turn OFF of the thyristor of FIG. 1a when a trapezoidal alternating current wave voltage is applied across the terminals $T_1$ and $T_2$ thereof. Current $I_{ON}$ is the ON state alternating current flowing through terminals $T_1$ and $T_2$ of the thyristor of FIG. 1a; voltage $V_{ON}$ is the ON state voltage across terminals $T_1$ and $T_2$ of the thyristor in FIG. 1a; current $I_R$ is the commutated current in the ON state of the thyristor of FIG. 1a depending upon the storage effect of the carrier; ratio $dv/dt$ is the slope of the voltage effective across the terminals $T_1$ and $T_2$ of the ON state thyristor in FIG. 1a at the crossing point of the voltage at the zero-axis; and ratio $di/dt$ is the slope of the ON state current $I_{ON}$ flowing through the terminals $T_1$ and $T_2$ of the thyristor of FIG. 1a when the direction of the flow of the latter current is reversed.

Generally, the maximum value of the voltage that is blocked off by the thyristor of FIG. 1a is a function of the junction temperature and the slope of the voltage $dv/dt$. Therefore, the thyristor is activated to the turned ON state when the junction temperature and the applied voltage have at least predetermined values and the slope $dv/dt$ of the forward voltage applied to the thyristor exceeds at least a critical value. This value is called the critical rate of rise of the OFF state voltage $dV/dt$ and is approximately 50 v./μs. which is approximately the same as that of the unidirectional thyristor. However, the critical rate of rise of the OFF state voltage $dV/dt$ of the bidirectional thyristor of FIG. 1a is substantially decreased with the increase in the slope $di/dt$ of the current flowing in the latter thyristor in the ON state when the latter thyristor is activated to the OFF state. This phenomenon is due to the specific composition of the bidirectional thyristor which is essentially a unitary structure having a bidirectional conductive characteristic.

FIG. 2b delineates the relationship between the critical rate of rise of the OFF state voltage $dV/dt$ of the bidirectional thyristor of FIG. 1a and the slope $di/dt$ of the current flowing through terminals $T_1$ and $T_2$ of the latter thyristor when a trapezoidal voltage is applied across the latter terminals. Curve A in FIG. 2b shows the case where the applied voltage has a low magnitude while curve B shows the case where the applied voltage has a high magnitude. It is therefore obvious in FIG. 2b that the critical rate of rise of the OFF state voltage $dV/dt$ is not greatly affected by the magnitude of the applied voltage if the slope $di/dt$ is large. FIG. 2c illustrates the relationship between the slope $di/dt$ of the current flowing through the turned ON thyristor of FIG. 1a and the ON state current $I_{ON}$ thereof in such manner that the slope $di/dt$ and current $I_{ON}$ are approximately proportional to each other.

FIGS. 3a, b and c show that when a gate signal $i_G$ is applied to terminal G at time $t_1$ and a trapezoidal alternating current voltage of a moderate slope is applied at the same time across terminals $T_1$ and $T_2$ of the bidirectional thyristor in FIG. 1a, the ON state current $I_{ON}$ in FIG. 3b flowing through the latter terminals decreases at the last part of the half-cycle with a moderate slope $di/dt$ as indicated by numeral 1. In this case, FIG. 3a shows that the slope of the voltage $dv/dt$ identified by numeral 2 is smaller than the critical rate of rise of the OFF state voltage $dV/dt$, and therefore the ON state voltage $V_{ON}$ of the bidirectional thyristor is smaller in magnitude as compared to that of voltage $V_{OFF}$ which is blocking the turn ON again of the latter thyristor. Thus, the thyristor is not turned ON again without the aid of another gate signal. It is therefore evident that each successive turn ON of the thyristor requires another gate signal.

FIGS. 4a, b and c illustrate that when a gate signal $i_G$ is applied to terminal G at time $t_1$ and a trapezoidal alternating current voltage is applied at the same time across terminals $T_1$ and $T_2$ of the bidirectional thyristor in FIG. 1a, the slope $di/dt$ of the ON state current $I_{ON}$ at the crossing point of the current and zero-axis is larger in FIG. 4b than the corresponding slope $di/dt$ in FIG. 3b whereby the critical rate of the rise of the OFF state voltage $dV/dt$ is reduced. Thus, the slope $dv/dt$ represented by numeral 4 in FIG. 4a exceeds the critical rate of rise of the OFF state voltage $dV/dt$. FIG. 4b shows that the ON state current $I_{ON}$ of thyristor of FIG. 1a as turned ON by gate pulse $i_G$ at time $t_1$ in FIG. 4c reverses its polarity at time $t_2$ after one half-cycle with a steep slope $di/dt$ as indicated by numeral 3 in FIG. 4b, and further that the ON state current $I_{ON}$ again reverses its polarity at time $t_3$ after another half-cycle with the same steep slope $di/dt$ as previously indicated by the latter reference numeral 3 in FIG. 4b. Thus, the turn ON of the bidirectoinal thyristor of FIG. 1a due to the simultaneous gate pulse $i_G$ and trapezoidal alternating voltage applied thereto in the manner above explained produces the steep slope 3 of the turn ON current $I_{ON}$ in FIG. 4b which is successively repeated at successive time intervals $t_1$, $t_2$, $t_3$ ... $t_{11}$ until eventually terminated in a manner that is hereinafter explained with regard to FIG. 5. As a consequence, the bidirectional thyristor of FIG. 1a activated by one gate pulse $i_G$ and the trapezoidal alternating voltage of FIGS. 4c and 4a, respectively, to the ON state is self-holding therein indefinitely in response to the reversed polarity ON current $I_{ON}$ shown in FIG. 4b and provided in the latter turned ON thyristor during each one-half cycle of the latter trapezoidal voltage.

FIG. 5 illustrates, in association with a source 5 of alternating current voltage and a load 6, a specific embodiment of the present invention comprising a parallel network 7e including a bidirectional conductive thyristor 7 (for example, an AC06B type) of FIG. 1a in a first branch 7f and a unidirectional thyristor 8 (for example, a 2SF14 type) in a second branch 7g. Circuit means 7h serves to connect the voltage source, load and parallel thyristor network in a circuit for the purpose of this explanation. This circuit is assumed to be in-operative at the moment so that the bidirectional and unidirectional thyristors are also assumed to be in a turned OFF state in the time interval from $t_0$ to $t_1$ in FIG. 6a thereby effectively establishing an open condition in the aforetraced circuit. Thus, bidirectional thyristor 7 and unidirectional thyristor 8 may be considered to be variable impedances adjusted to high impedance at the moment. It is assumed for the purpose of this explanation that source 5 supplies a sinusoidal alternating voltage having a relatively high frequency say, for example of the order of 10 kilocycles, load 6 has a resistance of approximately 35 ohms, and the voltage across terminals $T_1$ and $T_2$ is of the order of 140 volts when the bidirectional and unidirectional thyristors are in the turned OFF state. At this time, therefore, no current is permited to flow in the load.

In accordance with the operation of the specific embodiment of the invention of FIG. 5, it is assumed that source 5 supplies the sinusoidal alternating current voltage having waveform 25 in FIG. 6a across parallel network terminals $T_1$ and $T_2$ in the time from $t_0$ to $t_1$ in FIG. 6a while gate signal generator 15 supplies at time $t_1$ a unidirectional square-wave gate signal pulse $i_{GT}$ having a positive polarity and forming gate signal pulse 9 in FIG. 6d, as one example of a gate signal pulse suitable for the purpose of this explanation, to gate terminal GT of bidirectional thyristor 7. The alternating voltage coupled with the gate pulse activates bidirectional thyristor 7 to the turned ON state at time $t_1$ to provide therethrough a flow of alternating current $i_T$ shown in FIG. 6b and having at least a predetermined magnitude of the order of 4 amperes for the purpose of this explanation.

Concurrently with the turn ON of bidirectional thyristor 7, an alternating voltage $v_T$ (or 25a in FIG. 6a) effective across terminals $T_1$ and $T_2$ is lowered to a magnitude below that of the alternating voltage $V_T$ (or 25 in FIG. 6a) applied across the same terminals while the bidirectional thyristor was turned OFF. As unidirectional thyristor 8 is still turned OFF, i.e., is still in the high impedance state, and since bidirectional thyristor 7 is now turned ON, i.e., is in the low impedance state, the current $i_T$ of FIG. 6b flows in opposite directions through terminals $T_1$ and $T_2$ of parallel network 7e thereby establishing effectively a closed condition in the circuit of FIG. 5 to permit an alternating current $i_L$ to flow in load 6 while the voltage $v_T$ across terminal $T_1$ and $T_2$ at this time has a magnitude of the order of 1.6 volts for the purpose of this explanation.

The current $i_T$ in FIG. 6b is sufficient in magnitude to provide a self-holding ON state in bidirectional thyristor 7 whereby the latter is self-held turned ON or self-caused to remain in a continuous ON state without the aid of additional gate signal pulses equivalent to gate signal pulse 9 in FIGS. 5 and 6d. This is so because the slope $di/dt$ of the ON state current $i_T$ flowing through turned ON bidirectional thyristor 7 at the end of each half-cycle as shown in FIG. 6b is larger than a critical rate of rise of the OFF state voltage $dV/dt$, not shown, supplied by source 5 to terminals $T_1$ and $T_2$ of the turned OFF bidirectional thyristor 7, as hereinbefore explained with regard to FIGS. 4a, b and c. It is understood that holding time current $i_T$ in FIG. 6b corresponds to holding time current $I_H$ in FIG. 1c; thus, the holding time of turned ON bidirectional thyristor 7 is for a time interval equal to more than one or at least to two one-half cycles of the driving alternating voltage applied across terminals $T_1$ and $T_2$ by voltage source 5. This establishes the closed condition in FIG. 5 as above mentioned for a time interval equal to at least two one-half cycles of the driving voltage supplied by voltage source 5 to permit current to flow in the load for the latter time interval.

The turned ON bidirectional thyristor 7 in FIG. 5 is turned OFF in the following manner. Gate signal generator 16 supplies a unidirectional square-wave gate pulse current $i_{GS}$ having a positive polarity and forming gate signal 10 in FIG. 6d, the latter gate signal being similar to the above-mentioned gate signal 9, to gate terminal GS of unidirectional thyristor 8 at the time $t_2$ in FIG. 6d. This gate signal activates unidirectional thyristor 8 to the turned ON state to divert therethrough a portion $i_S$ of the alternating current flowing through the turned ON bidirectional thyristor 7. As an example of the amount of current diverted through turned ON unidirectional thyristor 8 from the current flowing in turned ON bidirectional thyristor 7, it is recalled from the previous explanation that a current $i_T$ of 4 amperes flowed through the turned ON bidirectional thyristor 7 while unidirectional thyristor 8 was turned OFF. Now, the current $i_S$ diverted through the turned ON unidirectional thyristor is of such amount represented by waveform 11 in FIG. 6c as to reduce the amount of current $i_T$ flowing through turned ON bidirectional thyristor 7 to the order of 1.3 amperes for the purpose of this explanation. This reduced amount of current precludes bidirectional thyristor 7 from being self-holding and causes turn-OFF therein at a time $t_3$ in FIG. 6d whereby the latter thyristor is returned to the high impedance state. Thus, the slope $di/dt$ of the ON state current flowing through the turned ON bidi-rectional thyristor 7 is reduced to a value below the critical rate of rise of the OFF state voltage $dV/dt$ applied to the terminals $T_1$ and $T_2$ of the latter thyristor. Since unidirectional thyristor 8 is not slef-holding, it also turns OFF at time $t_3$ in FIG. 6d whereby the high impedance state is returned therein. As both bidirectional and unidirectional thyristors 7 and 8, respectively, are now simultaneously returned to the turned OFF and high impedance state at time $t_3$ in FIG. 6d, the circuit including source 5, load 6 and parallel thyristor network 7e has the open condition re-established therein to terminate the flow of alternating current in load 6.

It is understood that a second bidirectional thyristor, not shown, may be substituted for the unidirectional thyristor 8 in the parallel thyristor network 7e in FIG. 5, and gating pulse 10 in FIG. 6d is applied to the gate terminal of the second bidirectional thyristor in order to turn OFF the first bidirectional thyristor 7. In such modified circuit of FIG. 5, the current flowing in both bidirectional thyristors decreases below the value represented by holding current $I_H$ in FIG. 1c at the moment immediately after both bidirectional thyristors are activated to the turned ON state. It is also understood that the circuit of FIG. 5 may be modified to include a two-terminal bidirectional thyristor (SSS type) in place of three-terminal bidirectional thyristor 7. It is further understood that voltage source 5 in FIG. 5 may supply as desired: (1) a trapezoidal alternating voltage; (2) a low frequency sinusoidal alternating voltage involving, for example, the third harmonic as shown in FIG. 7a; (3) a commercial sinusoidal alternating voltage combined with discrete pulses as illustrated in FIG. 7b; or (4) a square-wave alternating voltage having a very low frequency. It is apparent that the alternating current switching circuit of FIG. 5 may be useful to perform ON-OFF switching states in response to a single gate signal supplied by a phototransistor or the like. It is additionally evident that while the gate signal pulses 10 and 11 in FIGS. 5 and 6d are characterized as square-wave having a positive polarity, such signal pulses may have other shapes and a different polarity to perform the gating function equally as well as signal pulses 10 and 11.

It is understood that the invention herein is described in specific respects for the purpose of this explanation. It is also understood that such respects are merely illustrative of the application of the invention, particularly in the respects of the types of thyristors and combinations thereof, and the waveforms of the driving alternating voltages and gating pulses. Numerous other arrangements may be devised by those skilled in the art without departing from the spirit and scope of the invention.

What is claimed is:
1. An alternating current switching circuit, comprising:
a source of alternating voltage having a preselected frequency and a preselected waveform;
a load;
a network including first and second three-terminal variable impedance means having corresponding first and second terminals so interconnected that said first and second variable impedance means are in parallel, said first and second variable impedance means being variable at one time to turned OFF states for providing high impedance therein and at another time to turned ON states for providing low impedance therein, said first variable impedance means having self-holding bidirectional conductivity in said low impedance turned ON state and said second variable impedance means having non-holding unidirectional conductivity in said low impedance turned ON state; said source, load and network connected in said circuit wherein said source of alternating voltage effective at said corresponding first and second terminals has a critical rate of rise $dV/dt$ for maintaining said first and second variable impedance means in said turned OFF state of high impedance to establish effectively an open condition in said circuit including said load to prevent a flow of alternating current in said last-mentioned load;
means for applying a first gating pulse voltage having a preselected polarity and a preselected waveform at a first time $t_1$ to a third terminal of said first variable impedance means, where a rate of rise $dv/dt$ of voltage from said source of alternating voltage effective at said corresponding first and second terminals and said gating voltage is greater than said critical rate of rise $dV/dt$, for activating said last-mentioned means into said turned ON state to institute said self-holding low impedance bidirectional conductivity in said last-mentioned means to change said circuit including said source, load and network from said open condition to a closed condition to permit alternating current to flow in opposite directions in said load holding said first variable impedance means in said turned ON state in response to said last-mentioned alternating current having a rate of rise $di/dt$ which is larger than said critical rate of rise $dV/dt$;
and means for applying a second gating pulse voltage having a preselected polarity and a preselected waveform at a second time $t_2$ to a third terminal of said second variable impedance means for activating said last-mentioned means into said turned ON state to institute said non-holding low impedance unidirectional conductivity therein to divert through said last-mentioned means such amount of said holding current from said turned ON first variable impedance means as to decrease the amount of said holding current flowing in said last-mentioned means at a rate of rise $di/dt$, which is smaller than said critical rate of rise $dV/dt$, to turn OFF said last-mentioned means to institute said high impedance therein at a third time $t_3$ at which said second means is also turned OFF to institute said high impedance therein to restore said open condition in said circuit including said load to terminate the flow of said alternating current in said last-mentioned load;
whereby a time interval extending between said first and third times $t_1$ and $t_3$, respectively, constitutes an ON state of said switching circuit including said source, load and network therein.

2. The switching circuit according to claim 1, in said first variable impedance means comprises a self-holding three-terminal bidirectional thyristor having first and second terminals connected in said network; and said means for applying a first gating pulse voltage being connected to a third terminal of said last-mentioned thyristor.

3. The switching circuit according to claim 1, in which said second variable impedance means comprises a non-holding three-terminal unidirectional thyristor having first and second terminals connected in said network; and said means for applying a second gating pulse voltage being connected to a third terminal of said last-mentioned thyristor.

4. The switching circuit according to claim 1, in which said first variable impedance means comprises a self-holding three-terminal bidirectional thyristor having first and second terminals connected in said network; said means for applying a first gating pulse voltage being connected to a third terminal of said last-mentioned thyristor;
and said second variable impedance means comprises a non-holding three-terminal unidirectional thyristor having first and second terminals connected in said network; said means for applying a second gating pulse voltage being connected to a third terminal of said last-mentioned thyristor.

5. The switching circuit according to claim 1, in which said means for applying a first gating pulse voltage applies said first gating pulse voltage having a positive polarity and an approximately square waveform to said third terminal of said first variable impedance means.

6. The switching circuit according to claim 1, in which said means for applying a second gating pulse voltage applies said second gating pulse voltage having a positive polarity and an approximately square waveform to said third terminal of said second variable impedance means.

7. The switching circuit according to claim 1, in which said means for applying a first gating pulse voltage applies said first gating pulse voltage having a positive polarity and an approximately square waveform to said third terminal of said first variable impedance means; and said means for applying a second gating pulse voltage applies said second gating pulse voltage having a positive polarity and an approximately square waveform to said third terminal of said second variable impedance means.

8. The switching circuit according to claim 1, in which said first variable impedance means comprises a three-terminal self-holding bidirectional thyristor having first and second terminals connected in said network; and said means for applying a first gating pulse voltage means applies said first gating pulse voltage having a positive polarity and an approximately square waveform to a third terminal of said last-mentioned thyristor.

9. The switching system according to claim 1, in which said second variable impedance means comprises a three-terminal non-holding unidirectional thyristor having first and second terminals connected in said network; and means for applying a second gating pulse voltage applies said second gating pulse voltage having a positive polarity and an approximately square waveform to a third terminal of said last-mentioned thyristor.

10. The switching system according to claim 1, in which said first variable impedance means comprises a three-terminal self-holding bidirectional thyristor having first and second terminals connected in said network; said means for applying a first gating pulse voltage applies said first gating pulse voltage having a positive polarity and an approximately square waveform to a third terminal of said last-mentioned thyristor; said second variable impedance means comprises a three-terminal non-holding unidirectional thyristor having first and second terminals connected in said network; and said means for applying a second gating pulse voltage applies said second gating pulse voltage having a positive polarity and an approximately square waveform to a third terminal of said last-mentioned thyristor.

11. An alternating current switching circuit, comprising:
a source of an alternating voltage having a preselected frequency and a preselected waveform;
a load;
a network including a three-terminal bidirectional thyristor and a three-terminal unidirectional thyristor, said thyristors having corresponding first and second terminals so interconnected that said thyristors are in parallel, said thyristors having corresponding third terminals serving as gating terminals, said thyristors turned OFF at one time to provide high impedance therein and turned ON at another time to provide low impedance therein, said bidirectional thyristor having self-holding bidirectional conductivity when turned ON and said unidirectional thyristor having non-holding unidirectional conductivity when turned ON; said source, load and network connected in series in said circuit wherein said source of an alternating voltage at said corresponding first and second terminals has a critical rate of rise $dV/dt$ for maintaining said bidirectional and unidirectional thyristors turned OFF to provide said high impedance therein to establish effectively an open condition in said circuit including said load to prevent a flow of alternating current in said last-mentioned load;

means applying a first gating pulse voltage having a preselected polarity and a preselected waveform at a first time $t_1$ to said third terminal of said bidirectional thyristor, where a rate of rise $dv/dt$ of said gating voltage and said source of alternating voltage is greater than said critical rate of rise $dV/dt$, for turning ON said last-mentioned thyristor to institute said self-holding low impedance bidirectional conductivity therein to change said circuit including said source, load and network from said open condition to a closed condition to permit alternating current to flow in opposite directions in said load and said last-mentioned thyristor in said last-mentioned circuit to hold said last-mentioned thyristor turned ON in response to said last-mentioned current having a rate of rise $di/dt$ which is larger than said critical rate of rise $dV/dt$;

and means applying a second gating pulse voltage having a preselected polarity and a preselected waveform as combined with a voltage effective across said corresponding first and second terminals at a second time $t_2$ to said third terminal of said unidirectional thyristor for turning ON said last-mentioned thyristor to institute said non-holding low impedance unidirectional conductivity therein to divert through said last-mentioned turned ON unidirectional thyristor such amount of said holding current in one direction from said turned ON bidirectional thyristor as to decrease the amount of said last-mentioned current flowing in said last-mentioned thyristor to a value having a rate of rise $di/dt$, which is smaller than said critical rate of rise $dV/dt$, to turn OFF said last-mentioned thyristor to institute high impedance therein at a third time $t_3$ at which said unidirectional thyristor is also turned OFF to institute said high impedance therein to restore said open condition in said circuit including said load to terminate the flow of said alternating current in said last-mentioned load;

whereby a time interval extending between said first and third times $t_1$ and $t_3$, respectively, constitutes an ON state of said switching circuit including said source, load and network therein.

References Cited
UNITED STATES PATENTS 3,392,284  7/1968  Cain _____ 307—305 X

OTHER REFERENCES

Pub. I "Turn-off Circuits for Controlled Rectifiers" in Electronics by Jones, vol. 33, No. 32 dtd. Aug. 5, 1960, pp. 52 to 55.

Pub. II "How To Suppress Rate Effect in PN PN Devices" in Semiconductor Products Dept. General Electric Co. Paper 90:21, June 1964, 4 pages. By Stasior.

STANLEY D. MILLER, Primary Examiner

U.S. Cl. X.R.

307—284, 305